United States Patent
DiGiovanni (10) Patent No.: US 8,771,391 B2
(45) Date of Patent: Jul. 8, 2014

(54) METHODS OF FORMING POLYCRYSTALLINE COMPACTS

(75) Inventor: Anthony A. DiGiovanni, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 427 days.

(21) Appl. No.: 13/032,192

(22) Filed: Feb. 22, 2011

(65) Prior Publication Data
US 2012/0211284 A1   Aug. 23, 2012

(51) Int. Cl.
*B24D 3/02* (2006.01)
*C09C 1/68* (2006.01)
*C09K 3/14* (2006.01)

(52) U.S. Cl.
USPC .................. 51/307; 51/295; 51/309; 419/35

(58) Field of Classification Search
None
See application file for complete search history.

(56) References Cited

U.S. PATENT DOCUMENTS

| | | | |
|---|---|---|---|
| 4,224,380 A | 9/1980 | Bovenkerk et al. | |
| 5,096,465 A * | 3/1992 | Chen et al. | 51/295 |
| 5,127,923 A | 7/1992 | Bunting et al. | |
| 5,954,147 A | 9/1999 | Overstreet et al. | |
| 6,238,280 B1 | 5/2001 | Ritt et al. | |
| 7,528,086 B2 | 5/2009 | Villalobos et al. | |
| 7,806,206 B1 | 10/2010 | Miess | |
| 2008/0073127 A1* | 3/2008 | Zhan et al. | 51/295 |
| 2008/0209818 A1* | 9/2008 | Belnap et al. | 51/307 |
| 2010/0199573 A1 | 8/2010 | Montross et al. | |

FOREIGN PATENT DOCUMENTS

| | | | |
|---|---|---|---|
| JP | 60060965 A | * | 4/1985 |
| JP | 62133026 A | * | 6/1987 |
| JP | 2000313929 A | | 11/2000 |

OTHER PUBLICATIONS

International Search Report for PCT application No. PCT/US2012/025262, mailed Dec. 26, 2012.
Adams et al., Effect of Adsorbed Sulfate and Fluoride on the Density of Hot-Pressed Beryllium Oxide, J. Am. Ceram. Soc., Dec. 1967, p. 685.
Benecke et al., Effect of LiF on Hot-Pressing of MgO, J. Am. Ceram. Soc., Jul. 1967, vol. 50, No. 7, pp. 365-368.
Comeforo et al., Synthetic Mica Investigations: I, A Hot-Pressed Machinable Ceramic Dielectric, J. Am. Ceram. Soc., vol. 39, No. 9, Sep. 1053, pp. 286-294.
Hart et al., Densification Mechanism in Hot-Pressing of Magnesia with a Fugitive Liquid, J. Am. Ceram. Soc., Feb. 1970, vol. 53, No. 2, pp. 83-86.

(Continued)

*Primary Examiner* — Kaj K Olsen
*Assistant Examiner* — Ross J Christie
(74) *Attorney, Agent, or Firm* — TraskBritt (57) ABSTRACT

Methods of forming a polycrystalline compact using at least one metal salt as a sintering aid. Such methods may include forming a mixture of the at least one metal salt and a plurality of grains of hard material and sintering the mixture to form a hard polycrystalline material. During sintering, the metal salt may melt or react with another compound to form a liquid that acts as a lubricant to promote rearrangement and packing of the grains of hard material. The metal salt may, thus, enable formation of hard polycrystalline material having increased density, abrasion resistance, or strength. The metal salt may also act as a getter to remove impurities (e.g., catalyst material) during sintering. The methods may also be employed to faun cutting elements and earth-boring tools.

18 Claims, 4 Drawing Sheets

(56) References Cited

OTHER PUBLICATIONS

Gazza et al., Transparent Sc2O3 by Hot-Pressing, Journal of Materials Science (1971) vol. 6, pp. 1137-1139.
Reimanis et al., A Review on the Sintering and Microstructure Development of Transparent Spinel (MgAl2O4), J. Am. Ceram. Soc., Jul. 2009, vol. 92, No. 7, pp. 1472-1480.
Rozenberg et al., Chemical Interaction Between LiF and MgAl2O4 Spinel During Sintering, J. Am. Ceram. Soc., vol. 90, No. 7 (2007), pp. 2038-2042.
International Preliminary Report on Patentability and Written Opinion for International Application No. PCT/US2012/025262 dated Aug. 27, 2013, 8 pages.

* cited by examiner

METHODS OF FORMING POLYCRYSTALLINE COMPACTS

FIELD

Embodiments of the present disclosure relate to methods of forming polycrystalline compacts, which may be used, for example, as cutting elements for earth-boring tools, as well as to resulting cutting elements and earth-boring tools including such cutting elements.

BACKGROUND

Earth-boring tools for foaming wellbores in subterranean earth formations generally include a plurality of cutting elements secured to a body. For example, fixed-cutter earth-boring rotary drill bits (also referred to as "drag bits") include a plurality of cutting elements that are fixedly attached to a bit body of the drill bit. Similarly, roller cone earth-boring rotary drill bits may include cones mounted on bearing pins extending from legs of a bit body such that each cone is capable of rotating about the bearing pin on which it is mounted. A plurality of cutting elements may be mounted to each cone of the drill bit. In other words, earth-boring tools typically include a bit body to which cutting elements are attached.

The cutting elements used in such earth-boring tools often include polycrystalline diamond compacts (often referred to as "PDCs"), one or more surfaces of which may act as cutting faces of the cutting elements. Polycrystalline diamond material is material that includes interbonded grains or crystals of diamond material. In other words, polycrystalline diamond material includes direct, inter-granular bonds between the grains or crystals of diamond material. The terms "grain" and "crystal" are used synonymously and interchangeably herein.

Polycrystalline diamond compact cutting elements are typically formed by sintering and bonding together relatively small diamond grains under conditions of high temperature and high pressure in the presence of a catalyst (e.g., cobalt, iron, nickel, or alloys and mixtures thereof) to form a layer (e.g., a compact or "table") of polycrystalline diamond material on a cutting element substrate. These processes are often referred to as high temperature/high pressure (HTHP) processes. For example, a powdered catalyst material may be mixed with the diamond grains prior to sintering the grains together in an HTHP process.

Upon formation of a diamond table using an HTHP process, catalyst material may remain in interstitial spaces between the grains of diamond in the resulting polycrystalline diamond compact. The presence of the catalyst material in the diamond table may contribute to thermal damage in the diamond table when the cutting element is heated during use, due to friction at the contact point between the cutting element and the formation.

Polycrystalline diamond compact cutting elements in which the catalyst material remains in the polycrystalline diamond compact are generally thermally stable up to a temperature of about 750° C., although internal stress within the cutting element may begin to develop at temperatures exceeding about 350° C. This internal stress is at least partially due to differences in the coefficients of thermal expansion of the diamond table and the cutting element substrate to which it is bonded. This differential in thermal expansion coefficients may result in relatively large compressive and tensile stresses at the interface between the diamond table and the substrate, and may cause the diamond table to delaminate from the substrate. At temperatures of about 750° C. and above, stresses within the diamond table itself may increase significantly due to differences in the coefficients of thermal expansion of the diamond material and the catalyst material within the diamond table. For example, cobalt may have a linear coefficient of thermal expansion significantly higher than diamond, which may cause cracks to form and propagate within the diamond table as the diamond table heats, eventually leading to deterioration of the diamond table and ineffectiveness of the cutting element.

Furthermore, at temperatures at or above about 750° C., some of the diamond crystals within the polycrystalline diamond compact may react with the catalyst material, causing the diamond crystals to undergo a chemical breakdown or back-conversion to another allotrope of carbon or another carbon-based material. For example, the diamond crystals may graphitize at the diamond-crystal boundaries, which may substantially weaken the diamond table. At extremely high temperatures, in addition to graphite, some of the diamond crystals may be converted to carbon monoxide and/or carbon dioxide.

In order to reduce the problems associated with different coefficients of thermal expansion and chemical breakdown of the diamond crystals in polycrystalline diamond compact cutting elements, so-called "thermally stable" polycrystalline diamond compacts (which are also known as thermally stable products, or "TSPs") have been developed. Such a thermally stable polycrystalline diamond compact may be formed by leaching the catalyst material (e.g., cobalt) out from interstitial spaces between the interbonded diamond crystals in the diamond table using, for example, an acid or combination of acids (e.g., aqua regia). All of the catalyst material may be removed from the diamond table, or catalyst material may be removed from only a portion thereof. Thermally stable polycrystalline diamond compacts in which substantially all catalyst material has been leached out from the diamond table have been reported to be thermally stable up to temperatures of about 1,200° C. It has also been reported, however, that such fully leached diamond tables are relatively more brittle and vulnerable to shear, compressive, and tensile stresses than are non-leached diamond tables. In addition, it is difficult to secure a fully leached diamond table to a supporting substrate.

BRIEF SUMMARY

In some embodiments, the present disclosure includes methods of forming a polycrystalline compact. The methods may include combining a plurality of hard particles with a metal salt to form a powder mixture and sintering the powder mixture to form the polycrystalline compact. For example, the powder mixture may be molded to form an unsintered perform. The metal salt may include at least one of lithium fluoride, magnesium fluoride, beryllium fluoride, calcium fluoride, aluminum fluoride, silicon fluoride and gallium fluoride.

Such methods may additionally include forming an unsintered preform by forming a powder mixture comprising a metal salt and a plurality of grains of hard material and disposing the powder mixture within a container, disposing a substrate in contact with the powder mixture, and sintering the unsintered preform.

Additional embodiments of the disclosure comprise cutting elements comprising a polycrystalline compact of a hard material, wherein the hard material comprises a metal diffused into grains thereof.

Further embodiments include earth-boring tools having cutting elements according to embodiments of the disclosure secured thereto.

BRIEF DESCRIPTION OF THE DRAWINGS

While the specification concludes with claims particularly pointing out and distinctly claiming what are regarded as embodiments of the present invention, various features and advantages of embodiments of the invention may be more readily ascertained from the following description of some embodiments of the invention when read in conjunction with the accompanying drawings, in which:

DETAILED DESCRIPTION

The illustrations presented herein are not actual views of any particular cutting element, polycrystalline compact, microstructure of polycrystalline material, particles, or drill bit, and are not drawn to scale, but are merely idealized representations that are employed to describe the present invention. Additionally, elements common among figures may retain the same numerical designation.

As used herein, the term "hard material" means and includes any material having a Knoop hardness value of about 3,000 Kg/mm$^2$ (29,420 MPa) or more. Hard materials include, for example, diamond and cubic boron nitride.

The term "polycrystalline material" means and includes any material comprising a plurality of grains (i.e., crystals) of the material that are bonded directly together by inter-granular bonds. The crystal structures of the individual grains of the material may be randomly oriented in space within the polycrystalline material.

As used herein, the term "inter-granular bond" means and includes any direct atomic bond (e.g., covalent, metallic, etc.) between atoms in adjacent grains of material.

As used herein, the term "earth-boring tool" means and includes any tool used to remove subterranean formation material and form a bore (e.g., a wellbore) through the formation by way of the removal of a portion of the formation material. Earth-boring tools include, for example, rotary drill bits (e.g., fixed-cutter or "drag" bits and roller cone or "rock" bits), hybrid bits including both fixed cutters and roller elements, coring bits, percussion bits, bi-center bits, casing mills and drill bits, exit tools, reamers (including expandable reamers and fixed-wing reamers), and other so-called "hole-opening" tools.

As used herein, the term "cutting element" means and includes any element of an earth-boring tool that is used to shear, crush, grind or otherwise remove formation material when the earth-boring tool is used to form or enlarge a bore in the formation.

As used herein, the term "catalyst material" means and includes any material that is capable of substantially catalyzing the formation of inter-granular bonds between grains of hard material during an HTHP process. For example, catalyst materials suitable for use in forming inter-granular bonds between grains of diamond include cobalt, iron, nickel, other elements from Group VIIIA of the Periodic Table of the Elements, and alloys thereof.

As used herein, the term "milling," when used in relation to milling a plurality of particles, as opposed to a conventional milling operation conducted using a machine tool to remove material from a workpiece, means any process in which particles and any optional additives are mixed together to achieve a substantially uniform mixture.

The term "sintering" as used herein means and includes densification of a particulate component (e.g., an unsintered preform) involving removal of at least a portion of the pores between the starting particles, accompanied by shrinkage, combined with coalescence and bonding between adjacent particles.

As used herein, the term "getter" means and includes a material that absorbs, adsorbs or binds another, undesirable material.

As used herein, the term "aerosol" means and includes a suspension of particles or liquid droplets in a gas.

Embodiments of the current disclosure include methods of forming polycrystalline compacts from grains of hard particles using at least one metal salt (e.g., lithium fluoride) as a sintering aid. An unsintered preform may optionally be formed from the grains of hard material and particles of the sintering aid. The sintering aid may include, for example, a salt of lithium, magnesium and/or fluorine. For example, suitable sintering aids include any composition comprised of fluorine and an element from Group I or Group II of the Periodic Table of the Elements (e.g., sodium, potassium, beryllium, magnesium, calcium, strontium, or barium). By way of example and not limitation, the sintering aid may include a metal fluoride and/or at least one of lithium fluoride, magnesium fluoride, calcium fluoride, yttrium fluoride, lanthanum fluoride and aluminum fluoride. The grains of hard material may be formed from polycrystalline diamond, polycrystalline cubic boron nitride, or any other hard material.

The sintering aid may be combined with a plurality of the grains of hard material to form a powder mixture before sintering to enhance or improve the sintering process. For example, a slurry of the sintering aid and the grains of hard material dispersed in a liquid solvent may be formed, and a powder mixture may be generated from the slurry by way of a drying process that removes the liquid solvent(s), leaving a mixture of the aforementioned materials. The powder mixture may include the sintering aid interspersed with the grains of hard material. The powder mixture may optionally include a catalyst material (e.g., cobalt) for catalyzing the formation of inter-granular bonds during sintering. During the HTHP process, as the temperature increases, the sintering aid will melt into a liquid phase. The liquid may act as a lubricant during sintering, promoting rearrangement of grains of hard material and more efficient packing of the grains of hard material during compaction as a polycrystalline compact is formed by inter-granular bonding of the grains of hard material. In addition, the sintering aid may act to facilitate cleansing of impurities from the grains of hard material as the higher temperatures may promote the formation of hydrofluoric acid (HF) through the disassociation of the metal salt ions.

By way of example and not limitation, the sintering aid may include a powder including particles of the metal salt. The particles of the metal salt may each have an average diameter (i.e., particle size) of less than about 10% of the particle size of the grains of hard material. The particle size may influence the behavior of the sintering aid particles in the solvent. For example, smaller particles of sintering aid may dissolve more quickly or more completely than larger particles. For example, the sintering aid may include particles of a metal salt (i.e., metal fluoride particles) having a particle size (i.e., an average diameter) of between about 0.05 μm and about 5 μm.

The sintering aid may be combined with the grains of hard material to foam the powder mixture at any point before sintering the grains to form a polycrystalline compact (i.e., before pressing or compacting to form the unsintered preform). For example, the sintering aid may be mixed with the grains of hard material using techniques known in the art, such as conventional milling techniques, spray-drying techniques and sol-gel techniques, by forming and mixing a slurry that includes the sintering aid and the grains of hard material in a liquid solvent.

In some embodiments, the sintering aid may be combined with (e.g., suspended in, dissolved in, etc.) a liquid solvent to form a sintering aid mixture before being combined with the grains of the hard material. The liquid solvent may include, for example, one or more organic solvents (e.g., methanol, ethanol, hexane, etc.), polar solvents (e.g., deionized water), or a combination thereof In embodiments in which the sintering aid comprises metal fluoride particles, the metal fluoride particles may be dispersed in an organic solvent such that the mixture comprises a suspension of the metal fluoride particles in the organic solvent. In embodiments in which the sintering aid comprises metal fluoride particles, the metal fluoride particles may be dissolved in a polar solvent such that the mixture comprises an aqueous solution of the metal fluoride particles. The resulting mixture or solution may be combined with the grains of the hard material to form the slurry of the sintering aid and the grains of hard material in the liquid solvent.

The liquid solvent may be evaporated or otherwise removed from the slurry to form the powder mixture including the sintering aid dispersed in the grains of hard material. For example, the sintering aid may be substantially homogeneously dispersed on the grains of hard material. By way of example and not limitation, the powder mixture may be formed using a conventional milling process, such as, for example, a ball milling process or a rod milling process. Such processes may be conducted using, for example, a ball mill, a rod mill, or an attritor mill. As a non-limiting example, the slurry including the grains of hard material and the sintering aid in the liquid solvent may be provided in a generally cylindrical milling container (not shown). In some methods, grinding media also may be provided in the milling container together with the slurry. The grinding media may include discrete balls, pellets, rods, etc. formed from a hard material and having a larger particle size than the particles to be milled (i.e., the hard particles and the particles comprising the matrix material). The grinding media and/or the milling container may be formed from a material that is substantially similar or identical to the material of the hard particles and/or the sintering aid particles, which may reduce contamination of the powder mixture.

The milling container then may be rotated to cause the slurry and the optional grinding media to be rolled or ground together within the milling container. The milling process may cause changes in particle size in both the grains of hard particles and the sintering aid particles. The milling process may also cause the grains of hard particles to be at least partially coated with a layer of the sintering aid particles.

After milling, the slurry may be removed from the milling container and separated from the grinding media. The solid particles in the slurry then may be separated from the liquid solvent. For example, the liquid solvent of the slurry may be evaporated, or the solid particles may be filtered from the slurry to form the powder mixture.

Figure 1:
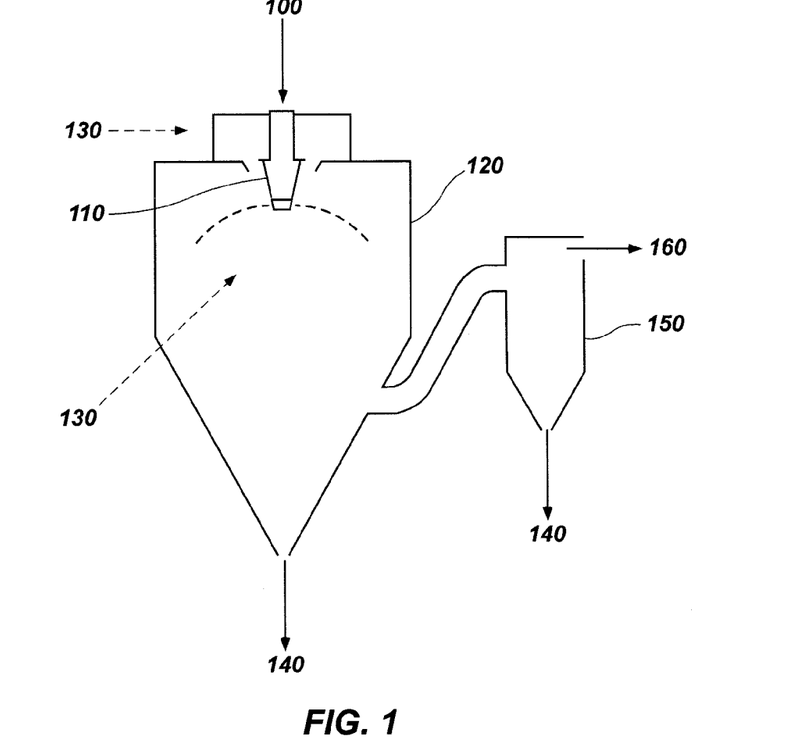
FIG. 1 is a simplified illustration of equipment that may be used to form a powder mixture in accordance with an embodiment of the present disclosure.
Figure 2:
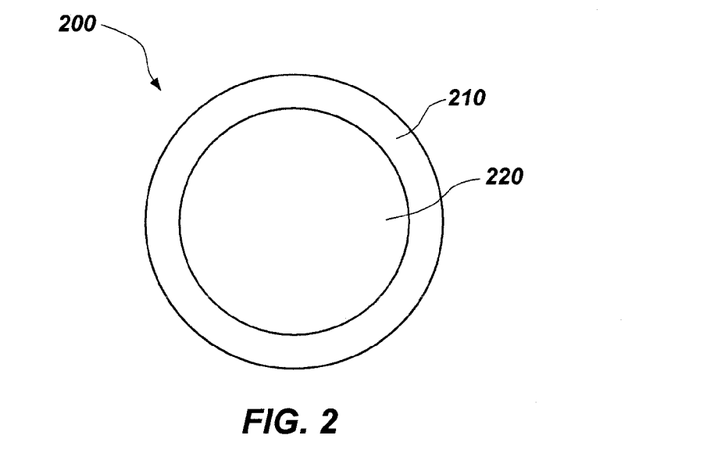
FIG. 2 is a simplified cross-sectional view of a grain of hard material coated with a sintering aid in accordance with an optional embodiment of the present disclosure.

As shown in FIGS. 1 and 2, the powder mixture may also be produced from the slurry using, for example, a conventional spray-drying process such as that described in U.S. Pat. No. 7,528,086 to Villalobos et al., issued May 5, 2009, the disclosure of which is incorporated herein in its entirety by this reference. Referring to FIG. 1, the slurry (represented by arrow 100) including the sintering aid and the grains of hard material in the liquid solvent may be dispersed using an atomization or spray nozzle 110. In some embodiments, the slurry 100 may be formed by mixing the sintering aid and the grains of hard particles before being dispersed through the nozzle 110. In other embodiments, the slurry 100 may be formed during the spray-drying process as the sintering aid and the grains of hard material are individually and simultaneously sprayed in the drying column 120.

A heated carrier gas 130, as shown by dashed lines, may be passed as a co-current and/or counter-current flow to the flow of slurry 100 from the nozzle 110 to initiate and enhance evaporation of the liquid solvent from the slurry 100. The slurry 100 may be dispersed into a drying column 120 as an aerosol to evaporate the liquid solvent from the slurry 100. The aerosol formed by emitting the slurry 100 through the nozzle 110 may include the sintering aid substantially homogeneously dispersed on the grains of hard material. The drying column 120 may be heated to promote evaporation of the liquid solvent from the slurry 100. For example, the drying column 120 may be heated by one or more heating elements (not shown), such as, electrical resistance heaters or hot water jackets, which may be disposed around the drying column 120 or along a wall of the drying column 120. Heating elements may be thermostatically controlled to maintain a selected temperature profile within the drying column 120. The drying column 120 may be heated to a temperature of less than or equal to a boiling point of the liquid solvent using the heated carrier gas 130 or the heating elements. In some embodiments, the drying column 120 may be configured to provide a temperature gradient, such that the temperature of the drying column 120 increases by between about 100° C. and about 500° C. as the aerosol travels through the drying column 120.

After the aerosol of the slurry 100 is sprayed into the drying column 120, the aerosol moves through the drying column 120 or falls down the drying column 120 if it is vertically disposed. A portion of the aerosol may also be passed into an exhaust chamber 150 that is interconnected to the drying column 120. As the aerosol moves through the drying column 120 and/or into the exhaust chamber 150, the liquid solvent evaporates to form the powder mixture (represented by arrow 140). The powder mixture 140 may be collected from the drying column 120 and/or the exhaust chamber 150. The powder mixture 140 may include the sintering aid dispersed and, if present, the catalyst material, dispersed in the grains of hard material. Excess exhaust gases (represented by arrow 160) may be expelled from the exhaust chamber 150 and, optionally, may be recycled to the drying column 120.

In some embodiments, the powder mixture 140 formed during the spray-drying process may include an agglomeration of particles. By way of example and not limitation, agglomerates (not shown) of particles may include from about 10 to about 500 particles of the original powder mixture (i.e., grains of hard material, particles of the sintering aid and/or catalyst material). The number of particles contained in the agglomerates and, thus, the size of the agglomerates, may be a function of the original starting particle sizes, the slurry chemistry and the conditions (e.g., temperature) used during the spray-drying process.

In other embodiments, evaporation of the liquid solvent may result in formation of a powder mixture 140 including coated grains of hard material 200, as shown in FIG. 2. For example, a coating 210 of the metal salt (i.e., lithium fluoride) may be formed over each grain of hard material 220. During the spray-drying process, gaseous expansion of the grain of hard material 220 may cause a portion of the coating 210 to be removed. Thus, while the coated grain of hard material 200 shown in FIG. 2 is completely surrounded with the coating 210, the grain of hard material 220 may be incompletely coated. Stated another way, coating 210 may be continuous, substantially continuous, or discontinuous. The coating 210 of the metal salt may have a thickness of between about 1 nm and about 500 μm and, more particularly, between about 10 nm and about 500 nm. Though the grain of hard material 220 is shown in FIG. 2 as having a spherical cross-sectional profile, the grains of hard material 220 may have any shape.

Figure 3:
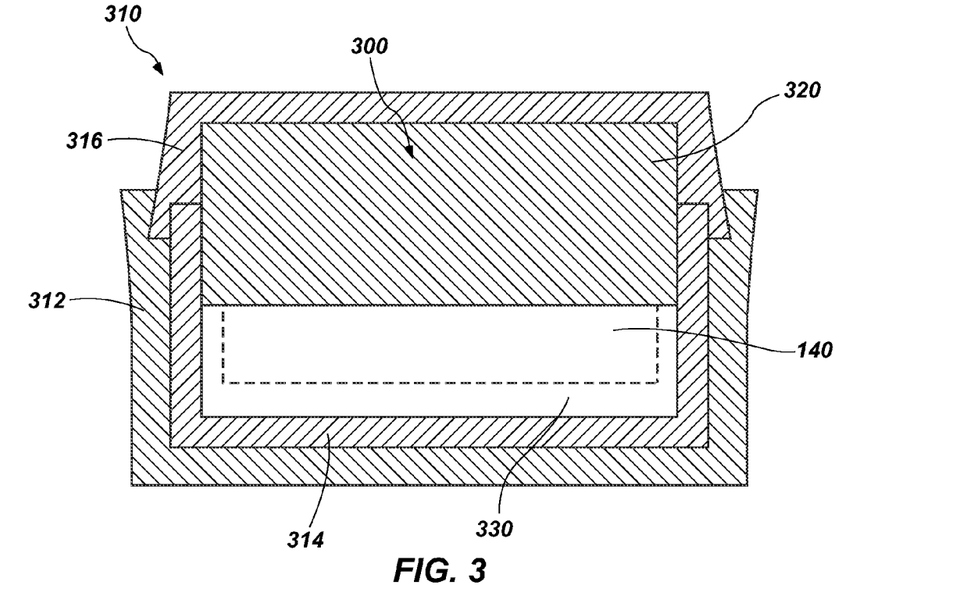
FIG. 3 is a simplified cross-sectional view of an assembly that may be used to form an unsintered preform in accordance with an embodiment of the present disclosure.

As shown in FIG. 3, the powder mixture 140 may optionally be used to form an unsintered preform 300 prior to a sintering process. For example, the powder mixture 140 may be disposed within a container 310. The powder mixture 140 or unsintered preform 300 may, optionally, be provided in the container 310 in contact with a cutting element substrate 320. The powder mixture 140 or unsintered preform 300, as the case may be, is used to form a hard polycrystalline material of a polycrystalline compact, as will be described. As is known in the art, a catalyst to stimulate inter-granular bonding between grains of hard material 220 (see FIG. 2) during sintering of one or more of these may be provided in the powder mixture 140 or the unsintered preform 300 if employed, the cutting element substrate 320, or both. Such a catalyst may include, for example, metallic elements from Group VIII of the Periodic Table of the Elements (e.g., iron, cobalt, nickel and ruthenium). Such catalysts may also include non-metallic elements, such as, phosphorous, carbonates (e.g., $Li_2CO_3$, $Na_2CO$, $MgCO_3$, $CaCO_3$, $SrCO_3$ and $K_2CO_3$), sulfates, (e.g., $Na_2SO_4$, $MgSO_4$ and $CaSO_4$), hydroxides (e.g., $Mg(OH)_2$ and $Ca(OH)_2$) and fullerenes.

The container 310 may include one or more generally cup-shaped members, such as the cup-shaped member 312, the cup-shaped member 314, and the cup-shaped member 316, which may be assembled and swaged and/or welded together to form the container 310. The powder mixture 140 or unsintered preform 300 and the optional cutting element substrate 320 may be disposed within the inner cup-shaped member 314, as shown in FIG. 3, which has a circular end wall and a generally cylindrical lateral side wall extending perpendicularly from the circular end wall, such that the inner cup-shaped member 314 is generally cylindrical and includes a first closed end and a second, opposite open end.

Optionally, a silicon material 330 (shown in broken lines, thickness is greatly exaggerated for clarity) may be provided within the container 310 before disposing the powder mixture 140 or unsintered preform 300 therein. The silicon material 330 may include silicon in one or more of a variety of forms, such as a powder, granules, platelets, rods, a film, and/or a layered material, whereby the layered material could be single or polycrystalline in nature.

For example, the silicon material 330 may include a layer of silicon at an interface between the container 310 and the powder mixture 140 or unsintered preform 300. As will be described, the silicon material 330 may be included as a getter, which may react, in addition to liquid catalyst, with excess sintering aid during the sintering process.

After providing the powder mixture 140 and, if present, the cutting element substrate 320 and the silicon material 330, within the container 310, the assembly may optionally be subjected to a cold pressing process to compact the powder mixture 140 to form an unsintered preform 300 if a preformed unsintered preform is not used. Further, prior to HPHT sintering, a vacuum heat treat process may be performed to remove some of the sintering aid. For example, the container 310 and its contents may be heated to a temperature up to about 1100° C. for a period of about 15 minutes or less.

Figure 4:
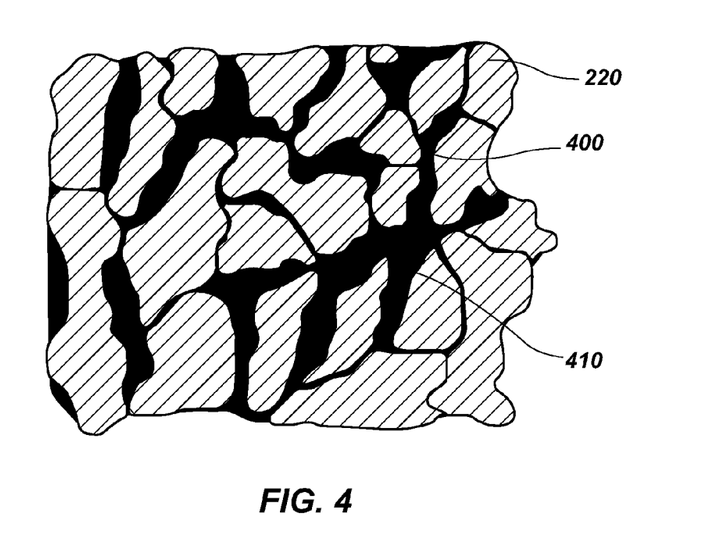
FIG. 4 is a simplified drawing showing how the microstructure of a portion of the unsintered preform of FIG. 3 may appear under magnification during sintering, and illustrates interspersed grains of hard material with catalyst metal in interstitial spaces between the grains of hard material.

FIG. 4 is an enlarged view illustrating how a microstructure of the powder mixture 140, or unsintered preform 300 of FIG. 3, may appear under magnification during the sintering process. As shown in FIG. 4, during the sintering process, constituents of the sintering aid may dissociate and respectively melt or react with other components within container 310 (e.g., the hard material or, if present, the silicon material 330 or the catalyst material).

For example, a metal constituent may melt and form a liquid 400 that occupies interstitial spaces 410 between the grains of hard material 220. The liquid 400 may wet the grains of hard material 220, acting as a lubricant that enables rearrangement and packing of the grains of hard material 220 before inter-granular bonds form between the grains of hard material 220 to form a polycrystalline material. As the grains of hard material 220 rearrange, space between the grains of hard material 220 may decrease providing an enhanced density of the grains of hard particles 220. Increasing density of the grains of hard particles 220 during sintering may impart improved properties to the resulting polycrystalline material, such as, improved strength and hardness, greater uniformity and reduced defects.

Another constituent of the sintering aid may act to reduce chemical impurities at the grain boundaries that could impede the sintering process. For example, in embodiments in which the sintering aid comprises a metal fluoride (e.g., lithium fluoride), the metal fluoride may dissociate, mix with hydrogen that may also be present in impurities, surface contaminations of the diamond, or as a constituent of the catalyst metal and form hydrofluoric acid. As is known in the art, hydrofluoric acid is a strong acid that reacts with impurities, such as metallic impurities. The fluorine may react with metallic components (e.g., the catalyst material) during the sintering process until the fluorine is consumed, effectively removing catalyst material and facilitating thermal stability of the polycrystalline compact resulting from the sintering process. The dissociated metal (e.g., lithium) readily diffuses into the grains of hard particles 220 during sintering. In embodiments in which the sintering aid comprises a lithium salt, the lithium salt may dissociate and the lithium may diffuse into the interstitial spaces 410 or may volatilize to form an inert impurity, which does not adversely affect the hardness or strength of the resulting polycrystalline material.

The silicon material 330 (FIG. 3), if present during the sintering process, may also act as a getter, helping to removing excess sintering aid. In embodiments in which the sintering aid comprises a metal fluoride (e.g., lithium fluoride), the silicon material 330 may react with the fluorine to remove the fluorine from interstitial spaces 410. Since the silicon material 330 may getter excess fluorine (i.e., fluorine that does not react with metals, catalyst, etc.) during the sintering process, the silicon material 330 may draw out residual fluorine that would otherwise remain in the interstitial spaces 410.

Figure 5:
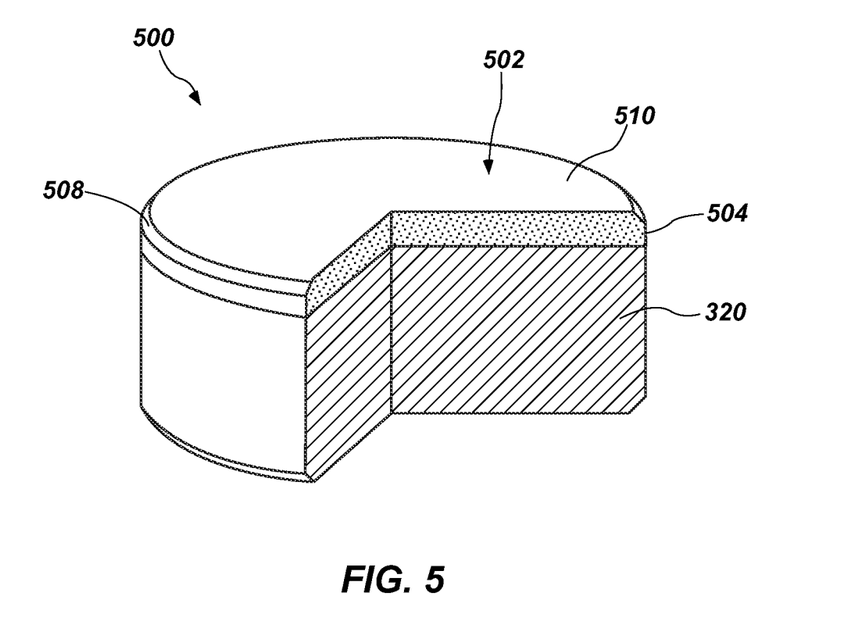
FIG. 5 is a partial cut-away perspective view illustrating an embodiment of a cutting element comprising a polycrystalline compact of the present disclosure.

For example, the resulting assembly shown in FIG. 3 may be sintered using an HTHP process in accordance with procedures known in the art to form a cutting element 500, as shown in FIG. 5. The cutting element 500 may include a hard polycrystalline material 510 that is optionally provided on (e.g., formed on or secured to) a surface of the cutting element substrate 320. In some embodiments, the hard polycrystalline material 510 comprises polycrystalline diamond. In other embodiments, the hard polycrystalline material 510 may comprise polycrystalline cubic boron nitride. The cutting element substrate 320 may comprise a cermet material such as cobalt-cemented tungsten carbide.

Although the exact operating parameters of HTHP processes will vary depending on the particular compositions and quantities of the various materials being sintered, the pressures in the heated press may be greater than about 5 GPa and the temperatures may be greater than about 1,500° C. In some embodiments, the pressures in the heated press may be greater than about 6.5 GPa (e.g., about 6.7 GPa). Furthermore, the materials being sintered may be held at such temperatures and pressures for between about 30 seconds and about 20 minutes.

Although an exact amount of the sintering aid present during sintering (i.e., the HTHP process) will vary depending on the particular compositions and quantities of the various materials being sintered, the sintering aid may comprise between about 0.01 weight percent (wt %) and about 20 wt % of the mixture and, more particularly, about 0.1 wt % to about 1 wt % of the mixture. An amount of the sintering aid may be controlled during the sintering process.

As shown in FIG. 5, the cutting element 500 has a generally cylindrical, or disc-shaped, configuration. An exposed, major surface of the hard polycrystalline material 510, which major surface may or may not be planar as depicted, defines a cutting face 502 of the cutting element 500. A lateral side surface 504 of the hard polycrystalline material 510 extends from the cutting face 502 of the hard polycrystalline material 510 to the cutting element substrate 320 on a lateral side of the cutting element 500. While a planar interface is depicted between the hard polycrystalline material 510 and cutting element substrate 320, non-planar interfaces of varying configurations and complexity are conventional and within the scope of the present disclosure. In the embodiment shown in FIG. 5, the hard polycrystalline material 510 may comprise a generally planar table that extends to and is exposed at the lateral side surface 504 of the cutting element 500. For example, a lower portion of the lateral side surface 504 of the hard polycrystalline material 510 may have a generally cylindrical shape, and an upper portion of a lateral side surface 504 of the polycrystalline compact adjacent the cutting face 502 may have an angled, frustoconical shape and may define or include, for example, one or more chamfer surfaces 508 of the cutting element 500.

Optionally, the cutting element 500 may be subjected to a conventional acid leaching process after sintering to remove substantially all the metal catalyst and remaining sintering aid from the hard polycrystalline material 510. Specifically, as known in the art and described more fully in U.S. Pat. No. 5,127,923 and U.S. Pat. No. 4,224,380, which are incorporated herein in their entirety by this reference, aqua regia (a mixture of concentrated nitric acid ($HNO_3$) and concentrated hydrochloric acid (HCl)) may be used to at least substantially remove catalyst material from the interstitial spaces between the diamond grains of the hard polycrystalline material 510. It is also known to use boiling hydrochloric acid (HCl) and boiling hydrofluoric acid (HF) as leaching agents. One particularly suitable leaching agent is hydrochloric acid (HCl) at a temperature of above 110° C., which may be provided in contact with exposed surfaces of the hard polycrystalline material 510 for a period of about 2 hours to about 60 hours, depending upon the size of the body comprising the hard polycrystalline material 510. Surfaces of the cutting element 500 other than those to be leached, such as surfaces of the cutting element substrate 320, may be covered (e.g., coated) with a protective material, such as a polymer material, that is resistant to etching or other damage from the leaching agent. The surfaces to be leached then may be exposed to and brought into contact with the leaching fluid by, for example, dipping or immersing at least a portion of the hard polycrystalline material 510 of the cutting element 500 into the leaching fluid.

The leaching fluid will penetrate into the hard polycrystalline material 510 of the cutting element 500 from the exposed surfaces thereof. The depth or distances into the hard polycrystalline material 510 from the exposed surfaces reached by the leaching fluid will be a function of the time to which the hard polycrystalline material 510 is exposed to the leaching fluid (i.e., the leaching time). During exposure to the leaching fluid, excess sintering aid and/or catalyst material may be leached out from the interstitial spaces within the hard polycrystalline material 510. After leaching the hard polycrystalline material 510, the interstitial spaces between inter-bonded grains of hard material within the hard polycrystalline material 510 may be at least substantially free of the sintering aid and the catalyst material.

Figure 6:
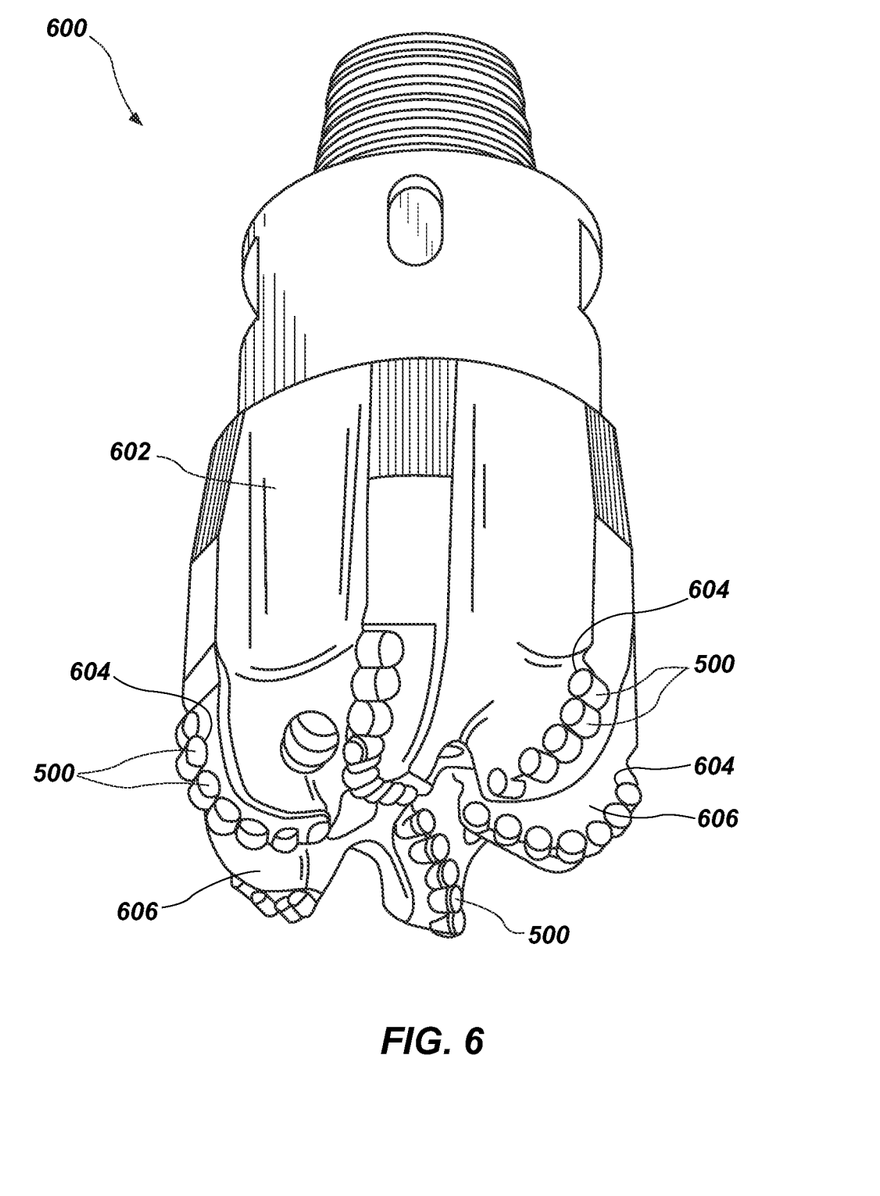
FIG. 6 is a perspective view of an embodiment of a fixed-cutter earth-boring rotary drill bit that includes a plurality of cutting elements like that shown in FIG. 5.

Embodiments of cutting elements and polycrystalline materials (e.g., compacts) of the invention, such as the cutting element 500 and the hard polycrystalline material 510 described with reference to FIG. 5, may be formed and secured to earth-boring tools for use in forming wellbores in subterranean formations. As a non-limiting example, FIG. 6 illustrates a fixed-cutter type earth-boring rotary drill bit 600 that includes a plurality of cutting elements 500 as previously described herein. The rotary drill bit 600 includes a bit body 602, and the cutting elements 500 are secured to the bit body 602. The cutting elements 500 may be brazed (or otherwise secured) within pockets 604 formed in an outer surface of each of a plurality of blades 606 of the bit body 602.

Cutting elements and polycrystalline compacts as described herein may be secured to and used on other types of earth-boring tools, including, for example, roller cone drill bits, percussion bits, core bits, eccentric bits, bi-center bits, reamers, expandable reamers, mills, hybrid bits, and other drilling bits and tools known in the art.

While the present invention has been described herein with respect to certain embodiments, those of ordinary skill in the art will recognize and appreciate that it is not so limited. Rather, many additions, deletions and modifications to the embodiments described herein may be made without departing from the scope of the invention as hereinafter claimed, including legal equivalents. In addition, features from one embodiment may be combined with features of another embodiment while still being encompassed within the scope of the invention as contemplated by the inventor.

What is claimed is:

1. A method of forming a polycrystalline compact, the method comprising: combining a plurality of diamond particles with lithium fluoride to form a powder mixture comprising the diamond particles and the lithium fluoride substantially homogeneously dispersed on the diamond particles; and sintering the powder mixture comprising the diamond particles and the lithium fluoride, wherein combining a plurality of diamond particles with fluoride comprises combining the plurality of diamond particles with the lithium fluoride dispersed in an organic solvent.

2. The method of claim 1, wherein combining a plurality of diamond particles with lithium fluoride comprises dispersing the plurality of diamond particles with particles of the lithium fluoride in an organic solvent.

3. The method of claim 1, wherein combining a plurality of diamond particles with lithium fluoride comprises combining a plurality of diamond particles with a solution comprising the lithium fluoride dissolved in a polar solvent.

4. The method of claim 1, wherein combining a plurality of diamond particles with lithium fluoride to form a powder mixture comprises:
   combining the plurality of diamond particles with the lithium fluoride in at least one solvent to form a slurry; and
   subjecting the slurry to a spray-drying process to form the powder mixture.

5. The method of claim 1, wherein combining a plurality of diamond particles with lithium fluoride to form a powder mixture comprises subjecting the plurality of diamond particles and a plurality of particles of the lithium fluoride to a milling process.

6. The method of claim 1, wherein sintering the powder mixture comprising the diamond particles and the lithium fluoride comprises fully sintering the powder mixture comprising the diamond particles and the lithium fluoride to form a hard polycrystalline material comprising interbonded hard particles of the plurality.

7. The method of claim 6, further comprising leaving at least a portion of the lithium fluoride within interstitial spaces between the interbonded hard particles of the plurality.

8. The method of claim 1, wherein sintering the powder mixture comprising the diamond particles and the lithium fluoride comprises removing at least a portion of the lithium fluoride from interstitial spaces between the diamond particles.

9. The method of claim 8, wherein removing at least a portion of the lithium fluoride from interstitial spaces between the diamond particles comprises reacting fluorine of the lithium fluoride with at least one catalyst material in contact with the powder mixture.

10. The method of claim 1, wherein sintering the powder mixture comprising the diamond particles and the lithium fluoride comprises heating the powder mixture to form liquid lithium fluoride between diamond particles of the plurality.

11. The method of claim 1, further comprising molding the powder mixture comprising the diamond particles and the lithium fluoride to form an unsintered preform.

12. The method of claim 1, wherein sintering the powder mixture comprising the diamond particles and the lithium fluoride comprises reacting a silicon material with fluorine of the lithium fluoride.

13. A method of forming a polycrystalline compact, comprising:
   forming an unsintered compact preform, comprising:
      mixing a solution comprising lithium fluoride with a plurality of diamond grains to form a powder mixture comprising a plurality of coated diamond grains comprising a coating of the lithium fluoride; and
      disposing the powder mixture within a container;
   disposing a cutting element substrate in contact with the powder mixture; and
   sintering the unsintered compact perform.

14. The method of claim 13, further comprising evaporating a solvent from the solution comprising the lithium fluoride.

15. The method of claim 13, further comprising exposing the polycrystalline compact to a temperature sufficient to volatilize the lithium fluoride under vacuum pressure to remove a residual portion of the lithium fluoride from the polycrystalline compact.

16. The method of claim 13, wherein disposing the powder mixture within a container comprises disposing the powder mixture in contact with a silicon material proximate an inner surface of the container.

17. The method of claim 13, wherein sintering the unsintered compact perform comprises heating the unsintered compact preform to melt the lithium fluoride to form a liquid that occupies interstitial spaces between the diamond grains.

18. The method of claim 17, wherein heating the unsintered compact preform to melt the lithium fluoride to form a liquid that occupies interstitial spaces between the diamond grains comprises lubricating the interstitial spaces between the diamond grains to promote rearrangement of the diamond grains.

* * * * *